March 19, 1963 J. C. KIMBROUGH 3,081,898
DOORSTEP BOX
Filed Feb. 20, 1961
2 Sheets-Sheet 1
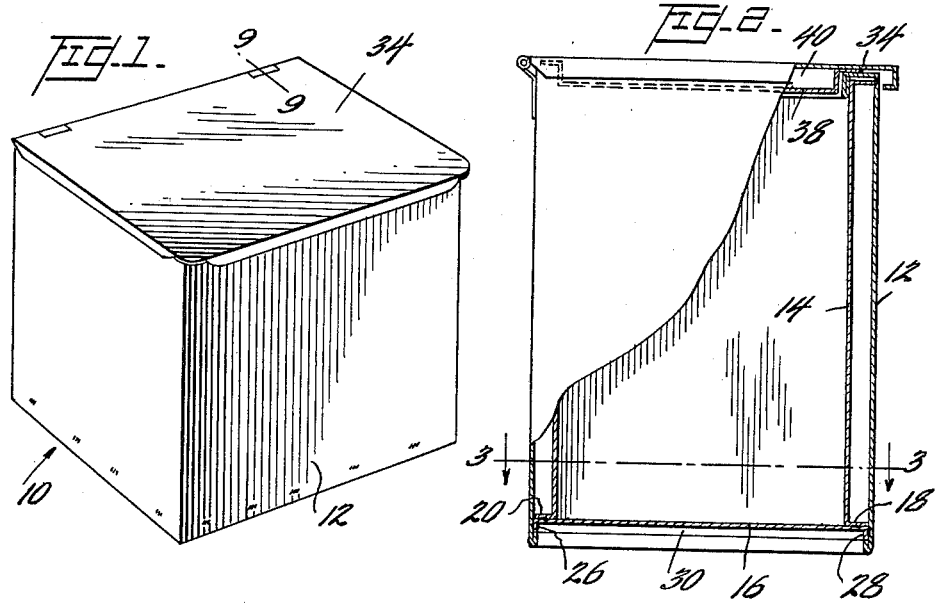
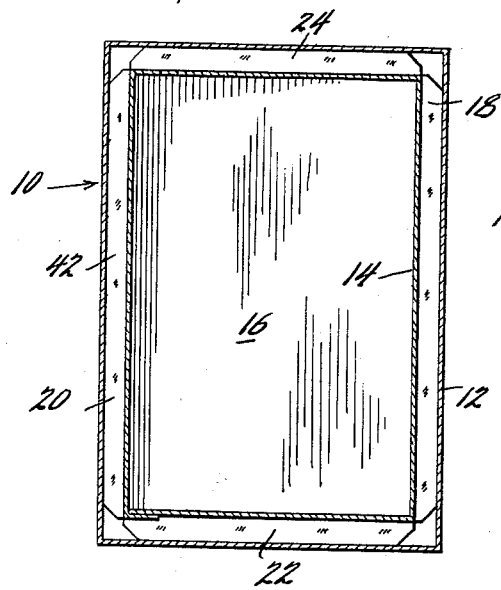
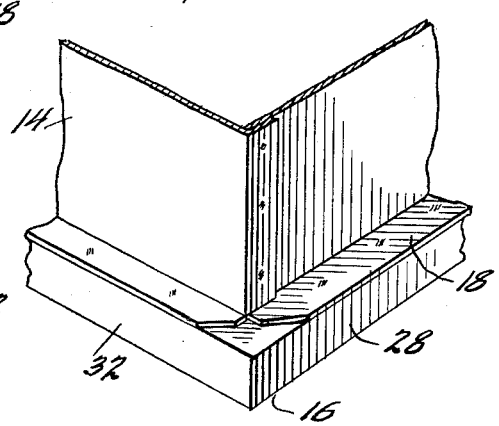
INVENTOR
J. C. Kimbrough,
BY Cushman, Darby & Cushman
ATTORNEYS March 19, 1963 J. C. KIMBROUGH 3,081,898
DOORSTEP BOX
Filed Feb. 20, 1961
2 Sheets-Sheet 2
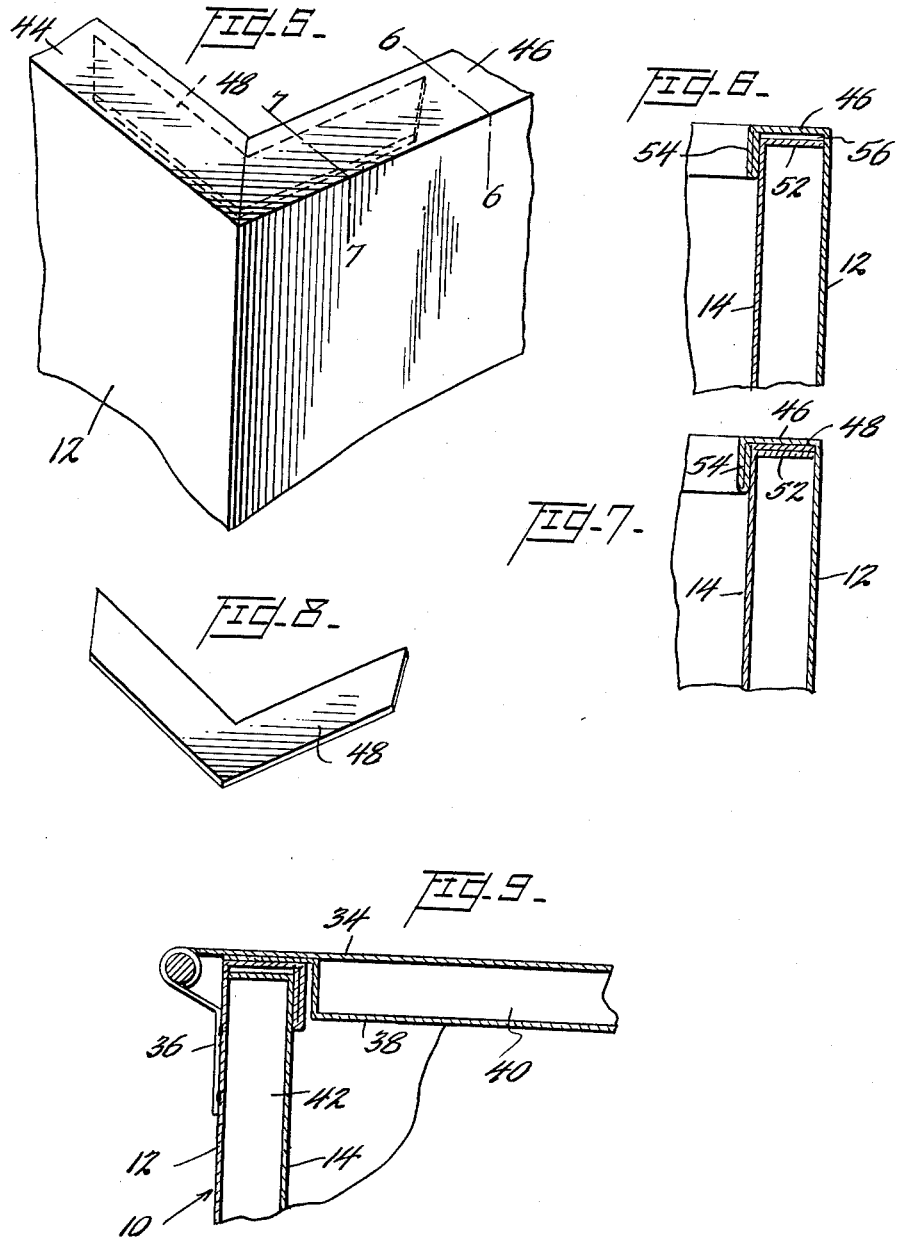
INVENTOR
J. C. Kimbrough,
BY Cushman, Darby & Cushman
ATTORNEYS

United States Patent Office 3,081,898
Patented Mar. 19, 1963

3,081,898
DOORSTEP BOX
Jacob C. Kimbrough, Chattanooga, Tenn., assignor to Cumberland Case Company, a corporation of Tennessee
Filed Feb. 20, 1961, Ser. No. 90,374
3 Claims. (Cl. 220—9)

The present invention relates to a spaced wall receptacle. More specifically, the invention relates to a spaced wall receptacle of the type used to contain packaged dairy products delivered to private residences.

The receptacles presently in use are usually of the type having secured to the inner walls or between spaced walls thereof a medium which will serve to insulate and protect milk and dairy products placed therein from outside temperatures.

A primary factor that must be considered in the production of receptacles of this nature is cost of manufacture. A receptacle constructed in accordance with the teachings of the present invention is much more economical to manufacture than the presently used insulated containers.

In the present manufacture of storage receptacles for dairy products delivered to the home, an insulating material is placed between spaced wall members forming the side and bottom of the receptacle and additional insulation is used in the cover which closes the upper end. Also, in previous construction of units of this type, a separate inner bottom has been used which had to be preassembled to the inner shell prior to assembling the box. This involved a rather complicated forming operation and the use of solder or other sealing means was necessary to effect a tight bond between the inner shell and the inner bottom. Subsequently, an outer bottom was secured to the container in spaced relation to the inner bottom, the space between the inner and outer bottom being filled with an insulating material.

A container constructed in accordance with the teachings of the present invention obviates the above disadvantages by providing a container construction with spaced inner and outer shell members eliminating an intermediate insulating material and utilizing only a dead air space between the wall portions of the inner and outer shells to serve the same function. Also, the provisions of a single bottom member, as used in the construction of the instant invention, joined to the inner shell by spot welding or other suitable means provides a fairly effective seal which is further enhanced by the use of a plastic sealing material rather than through the use of solder. The use of plastic materials is substantially more economical than the necessity for a soldering operation. Additionally, the elimination of a separate inner bottom results in further savings in so far as material cost, and labor are concerned.

An object of the present invention is a spaced wall receptacle having insulating qualities comparable to or better than receptacles of a similar type presently in use.

Another object of the invention is a spaced wall receptacle which eliminates the necessity for a separate insulating material incorporated in the construction.

Another object of the invention is a spaced wall receptacle which is more economical to manufacture utilizing a novel structure and simple assembly process.

Further objects and advantages will become apparent by referring to the following detailed description when taken with the accompanying drawings, wherein:

FIGURE 1 is a perspective view of the complete spaced wall receptacle,

FIGURE 2 is a side elevation of the spaced wall receptacle with parts in section illustrating the novel features of construction, FIGURE 3 is a sectional view taken on line 3—3 of FIGURE 2 illustrating the spacing of the inner and outer shell members, FIGURE 4 is an enlarged fragmentary perspective view of one of the corners of the inner shell illustrating the details of assembling the bottom member to the lower portion of the inner shell, FIGURE 5 is an enlarged fragmentary view of one of the upper corners of the assembled receptacles illustrating in dotted lines the placement of brace means at the corner, FIGURE 6 is an enlarged fragmentary sectional view taken on line 6—6 of FIGURE 5 illustrating the manner of fixing the upper end of the outer shell to the inner shell member, FIGURE 7 is an enlarged fragmentary sectional view taken on line 7—7 illustrating the position of the brace means, FIGURE 8 is a perspective view illustrating the brace used to add rigidity to the corners of the box, and FIGURE 9 is an enlarged fragmentary sectional view taken on line 9—9 of FIGURE 1 illustrating the hinge placement on the outer shell member and the detail of the fit of the top within the open upper end of the receptacle.

Referring to the drawings FIGURE 1 illustrates the completed receptacle 10 as constructed in accordance with the teachings of the present invention.

In FIGURE 2 the receptacle as shown comprises an outer shell 12 and spaced inwardly therefrom an inner shell 14. The inner shell has flanges at the upper and lower ends extending outwardly from the wall portion thereof. At the lower end of the inner shell 14, a bottom member 16 is secured by spot welding or other suitable means to the outwardly extending flanges 18, 20, 22 and 24, only flanges 18 and 20 being shown. The bottom 16 is constructed having the configuration of an inverted tray including downwardly extending wall portions 26, 28, 30 and 32. The lower portion of the outer shell 12 extends downwardly in intimate contact with the wall portions 26, 28, 30 and 32 of the bottom member 16. The outer shell 12 is secured to the wall portions 26, 28, 30 and 32 of the bottom 16 by spot welding or other suitable means. At its upper end the wall portions of the outer shell 12 are folded inwardly in overlying parallel relation to the outwardly extending flanges of the inner shell member 14, the details of which are best shown in FIGURES 6 and 7. The upper end of the container is closed by a cover 34 pivotally secured by a hinge 36 fixed to one of the wall portions of the outer shell member 12. The cover 34 is also of a spaced wall construction having secured to the underside thereof an inner lid member 38 formed so as to provide a dead air space 40 between the upper portion of the cover 34 and the wall portion of inner lid 38.

Shown in FIGURE 3 is the dead air space 42 between the inner shell 14 and the outer shell 12. Also shown are the outwardly extending flanges 18, 20, 22 and 24 to which the bottom member 16 is secured.

In FIGURE 4 there is shown in more detail the manner in which the outwardly extending flanges 18 and 22 from the inner shell 14, are secured to the upper portion of the bottom member 16. As shown the flanges 18 and 22 are in contact with te upper surface of the bottom member 16 and are secured thereto preferably by spot welding. In order to provide an effective seal between the flanged portions 18 and 22 and flanges 20 and 24 (not shown) and the bottom member 16 a plastic material is used on the joint. The use of a plastic material as a sealing means eliminates the more costly and time consuming soldering operation which has been used in former constructions to provide an effective seal between the inner bottom and the inner shell.

As previously stated, the outer shell member 12 is secured to the wall portions of 26, 28, 30 and 32 of the bottom member 16 by spot welding. At the upper end the wall portions of the outer shell 12 are folded inwardly in overlying relation to the flanges extending outwardly from the inner shell member 14 and then folded downwardly, parallel to and in contact with the inner wall portions of the inner shell 14. The details of which are best shown in FIGURES 6 and 7.

In order to add rigidity to the completed receptacle, angle brace members are positioned at diagonally opposite corners thereof, one of such braced corners is shown in FIGURE 5. The outer shell member 12 has the upper edge portions 44 and 46 folded inwardly in overlying relation to the outwardly extending flanges of the inner shell member 14. The inwardly folded upper edge portions 44 and 46 of the outer shell 12 are spaced from the outwardly extending flanges of the inner shell 14. Shown in dotted lines is the brace member 48 which is positioned in the space defined by the inwardly folded portions 44 and 46 of the outer shell 12 and the outwardly extending flanges of the inner shell member 14. Only two corners need be braced in this manner, since the brace 48 adds sufficient rigidity to the receptacle when positioned at diagonally opposite points.

In FIGURE 6 there is shown in detail the manner in which the outer shell member 12 has the upper end portion 46 folded inwardly in parallel relation to flange 52 which extends in an outward direction from the wall portion of the inner shell 14. Also shown is the downwardly folded portion 54 of the outer shell 12 which is in parallel relation to and in contact with the inner wall surface of the inner shell 14. As shown the inwardly folded portion 46 and the flange 52 define an area 56 which is of a dimension equal to the thickness of the brace 48. Also, the flanges extending out from the inner shell 14 engage the inner wall of the outer shell 12 and maintain the spacing between the inner and outer shell sidewalls.

In FIGURE 7 there is shown a view identical to that shown in FIGURE 6 illustrating the manner in which the brace member 48 is positioned between the inwardly folded portion 46 of the outer shell 12 and the flange 52 which extends out from the wall portion of inner shell member 14.

The brace 48 as shown in FIGURE 8, is substantially L-shaped whereby it conforms to the corner construction of the receptacle 10.

As shown in FIGURE 9 the open upper end of the receptacle 10 is closed by a cover member 34 which has a spaced wall construction similar to the side walls. The cover 34 is pivotally secured to the outer shell 12 by hinge 36 which is preferably spot welded thereto.

The receptacle as constructed, when placed on a flat surface will have a dead air space completely surrounding the dairy products which have been placed therein. The dead air space has insulating properties which are equal to or better than the characteristics of the material which has been previously used to serve as an insulation.

In order to determine the insulating qualities against external heat and cold of the receptacle disclosed in the instant invention in comparison to the insulating qualities of receptacles which are in present use for the same purpose, a series of tests were conducted by the Industrial Research Institute of the University of Chattanooga. A receptacle constructed in accordance with the teachings of the present invention and a receptacle constructed in the manner as those presently in use having an insulating material between the walls, were subjected to extremes of heat and cold. Contained within each of the receptacles were four milk bottles filled with cold water and additionally an unprotected milk bottle filled with cold water was placed along side the receptacles during the tests. The following table indicates the results of the heat and cold test.

[Temperature, ° F.]

| Time | Chest (1) | Diff. | Chest (2) | Diff. | Bottle | Diff. | Oven |
|---|---|---|---|---|---|---|---|
| 9:00 | 38 | 67 | 38 | 67 | 38 | 67 | 105 |
| 10:00 | 48 | 54 | 52 | 50 | 58 | 44 | 102 |
| 11:00 | 55 | 45 | 61 | 39 | 70 | 30 | 100 |
| 12:00 | 58 | 40 | 68 | 30 | 76 | 22 | 98 |
| 1:00 | 63 | 37 | 71 | 29 | 83 | 17 | 100 |
| 2:00 | 70 | 38 | 75 | 33 | 90 | 18 | 108 |
| 3:00 | 78 | 26 | 81 | 23 | 96 | 8 | 104 |
| 4:00 | 80 | 24 | 84 | 20 | 98 | 6 | 104 |

Chest number 1 is the receptacle of the instant invention having only a dead air space between the walls. Chest number 2 is a receptacle having an insulating material, for example, zonalite between the walls.

Both receptacles were placed in an oven and maintained at an elevated temperature for 48 hours before placing the milk bottles containing the cold water in them.

As the above heat test indicates the insulating properties afforded by the dead air space in the receptacle described in the present invention is somewhat better than the insulating properties afforded by the receptacle having an insulating material between the walls.

In the cold test, the procedure was substantially the same as the heat test with the exception of course that the receptacles were placed in a deep freeze unit. The results thereof are shown in the following table.

[Temperature, ° F.]

| Time | Chest (1) | Diff. | Chest (2) | Diff. | Bottle | Diff. | Freezer |
|---|---|---|---|---|---|---|---|
| 9:00 | 41 | 31 | 41 | 31 | 41 | 31 | 10 |
| 10:00 | 39 | 29 | 39 | 29 | 32 | 22 | 10 |
| 11:00 | 37 | 27 | 37 | 27 | | | 10 |
| 12:00 | 36 | 26 | 35 | 25 | | | 10 |
| 1:00 | 34 | 24 | 33 | 23 | | | 10 |
| 2:00 | 33 | 23 | 32 | 22 | | | 10 |
| 3:00 | 32 | 22 | Ice | 22 | | | 10 |
| 4:00 | Ice | 22 | | | | | 10 |

Chest number 1 is the receptacle of the instant invention having only a dead air space between the walls. Chest number 2 is a receptacle having an insulating material, for example, zonalite between the walls.

It will be noted by referring to the above table that the bottles of cold water were kept from freezing for a longer period of time when placed in the receptacle constructed in accordance with the teachings of the present invention, wherein only the dead air between the spaced walls of the receptacle served as the insulating medium.

While the invention has been described in its preferred embodiments, various modifications and improvements will become apparent to those skilled in the art. However, such modifications and improvements are considered to be within the spirit and scope of the appended claims.

What is claimed is:

1. A spaced wall receptacle comprising in combination inner and outer shell members, said inner and outer shell members including wall portions, said inner shell member having outwardly extending flanges at the upper and lower ends thereof, a bottom member in the form of an inverted tray secured to the flanges at the lower end of said inner shell member, said outer shell being secured at its lower end to said bottom member and having its upper end portions folded inwardly in overlying relation to said flanges at the upper end of said inner shell member, said inwardly folded portion of said outer shell member having a part thereof parallel to the inner wall portion of said inner shell member, brace means at upper corners between the overlying upper end portion of said outer shell member and the flanges at the upper end of said inner shell member, and a cover member pivotally secured to said outer shell member closing the upper portion of said receptacle.

2. A spaced wall receptacle as defined in claim 1 wherein said corner brace members are substantially L-shaped and overlie a portion of said flanges extending outwardly from at least two of the walls of the inner shell member.

3. A spaced wall receptacle rectangular in cross section comprising in combination inner and outer metal shell members, said inner and outer shell members including wall portions, each of said wall portions of said inner shell member having outwardly extending flanges at the upper and lower ends thereof, a bottom member in the form of an inverted tray having downwardly extending wall portions, said bottom member being secured to the flanges at the lower end of said inner shell member, said wall portions of said outer shell being secured at their lower ends to said downwardly extending wall portions of said bottom member, the upper end of each of said wall portions of said outer shell having portions folded inwardly in overlying relation to said flanges at the upper end of said inner shell member, said inwardly folded portion of said outer shell member having a part folded downwardly thereof parallel to and in engagement with the inner wall of said shell member, and the outwardly extending upper flanges of said inner shell member being in engagement with the inner wall of said outer shell.

References Cited in the file of this patent

UNITED STATES PATENTS

| | | |
|---|---|---|
| 1,205,111 | Schenbelin | Nov. 14, 1916 |
| 1,691,736 | Oppenheim | Nov. 13, 1928 |
| 1,832,502 | Poettich | Nov. 17, 1931 |
| 1,840,677 | Miessler | Jan. 12, 1932 |
| 1,879,256 | Houghland | Sept. 27, 1932 |
| 2,165,327 | Zalkind | July 11, 1939 |